United States Patent
Lee et al.

(10) Patent No.: US 9,882,504 B2
(45) Date of Patent: Jan. 30, 2018

(54) HVDC RECTIFIER PROTECTION USING ESTIMATED AND MEASURED POWER

(71) Applicant: Korea Electric Power Corporation, Naju-si, Jeollanam-do (KR)

(72) Inventors: Seong Doo Lee, Daejeon (KR); Soon Ho Choi, Daejeon (KR); Chan Ki Kim, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 0 days.

(21) Appl. No.: 15/360,336

(22) Filed: Nov. 23, 2016

(65) Prior Publication Data
US 2017/0155248 A1    Jun. 1, 2017

(30) Foreign Application Priority Data
Nov. 27, 2015 (KR) .......................... 10-2015-0167892

(51) Int. Cl.
| H02M 5/45 | (2006.01) |
| H02M 1/32 | (2007.01) |
| H02J 3/36 | (2006.01) |
| H02M 7/757 | (2006.01) |

(52) U.S. Cl.
CPC ........... H02M 5/4505 (2013.01); H02M 1/32 (2013.01); *H02J 3/36* (2013.01); *H02M 7/7575* (2013.01)

(58) Field of Classification Search
CPC .... H02M 5/4505; H02M 5/4805; H02M 1/32; H02H 7/10
See application file for complete search history.

(56) References Cited

U.S. PATENT DOCUMENTS

| 9,483,036 | B2 * | 11/2016 | Kaku ....................... H02P 23/12 |
| 2002/0105818 | A1 * | 8/2002 | Yoshikawa ...... G01R 19/16538 363/85 |
| 2015/0241503 | A1 * | 8/2015 | Bhandarkar ......... G01R 31/028 363/44 |

(Continued)

FOREIGN PATENT DOCUMENTS

KR    10-2013-0035766 A    4/2013

OTHER PUBLICATIONS

Korean Office Action dated Dec. 8, 2016 issued in Korean Patent Application No. 10-2015-0167892.

(Continued)

*Primary Examiner* — Harry Behm
*Assistant Examiner* — Peter Novak
(74) *Attorney, Agent, or Firm* — McDermott Will & Emery LLP

(57) ABSTRACT

An HVDC power increase controller includes a command output unit for outputting a current command value according to a disturbance signal to a main controller; a voltage drop determiner receiving an alternating current (AC) voltage and comparing a level of the AC voltage to a lowest level of a voltage causing a rectification failure; and a power tracking determiner receiving a direct current (DC) power and comparing a level of the DC power to an estimated power level corresponding to the current command value. The command output unit adjusts the current command value according to a comparison result of the voltage drop determiner and the power tracking determiner.

5 Claims, 5 Drawing Sheets

(56) References Cited

U.S. PATENT DOCUMENTS

2015/0333525 A1* 11/2015 Choi .................. H02J 3/36
                                                                                  700/287
2017/0126142 A1* 5/2017 Toujinbara ........ H02M 7/53875

OTHER PUBLICATIONS

Changjo Jeon, "A study on commutation failure analysis and protection algorithm of HVDC system for three-phase fault," Master's thesis, Incheon National University, published on Feb. 2014.
M.S. Son, et al., "A control algorithm to improve transient performance of HVDC system," The Korean Institute of Electrical Engineers, Summer Conference, Jul. 2015, pp. 441 and 442.

* cited by examiner

HVDC RECTIFIER PROTECTION USING ESTIMATED AND MEASURED POWER

CROSS-REFERENCE TO RELATED APPLICATION

This application claims the benefit of priority to Korean Patent Application No. 10-2015-0167892, filed on Nov. 27, 2015 with the Korean Intellectual Property Office, the entirety of which is incorporated herein by reference.

BACKGROUND

The present disclosure relates to a high voltage direct current (HVDC) power increase controller and an HVDC system including the same.

Extra HVDC power transmission is a power transmission method for supplying electric power to a load by transmitting power after converting an alternating current (AC) power generated in a power plant to a direct current (DC) and converting the DC back to the AC at the receiving end. HVDC power transmission may allow power to be efficiently and economically transmitted through voltage increase, which is an advantage of AC power transmission, and may overcome various shortcomings of the AC power transmission.

An HVDC system employing an HVDC power transmission method includes an HVDC power increase controller for maintaining stability with respect to DC power variations caused by a failure of an electric power system or a transient state.

SUMMARY

An aspect of the present disclosure provides a high voltage direct current (HVDC) power increase controller for stabilizing an HVDC system in the case of a failure caused by overloading, generator dropping or the like, and outputting a power command value close to a maximum direct current (DC) power point varying according to operating conditions, and an HVDC system including the same.

According to an aspect of the present disclosure, a high voltage direct current (HVDC) power increase controller includes: a command output unit outputting a current command value to a main controller according to a disturbance signal; a voltage drop determiner receiving an alternating current (AC) voltage, and comparing the AC voltage to a voltage at a lowest level causing a rectification failure; and a power tracking determiner receiving a direct current (DC) power, and comparing a level of the DC power to an estimated power level corresponding to the current command value. The command output unit may adjust the current command value according to a comparison result of the voltage drop determiner and the power tracking determiner.

According to an aspect of the present disclosure, a high voltage direct current (HVDC) system includes: a first transformer for transforming a first alternating current (AC) power; a first converter for converting the first AC power transformed in the first transformer to a direct current (DC) power according to control of a first local controller; a second converter for converting the DC power to a second AC power according to control of a second local controller; a second transformer for transforming the second AC power converted in the second converter; a main controller for controlling the first local controller and the second local controller; and an HVDC power increase controller for outputting a current command value having a step waveform according to input of a disturbance signal to the main controller. The HVDC power increase controller may compare a level of a voltage of the first AC power to a lowest level of a voltage causing a rectification failure and may compare a level of the DC power to an estimated power level corresponding to the current command value to adjust the current command value according to a comparison result.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
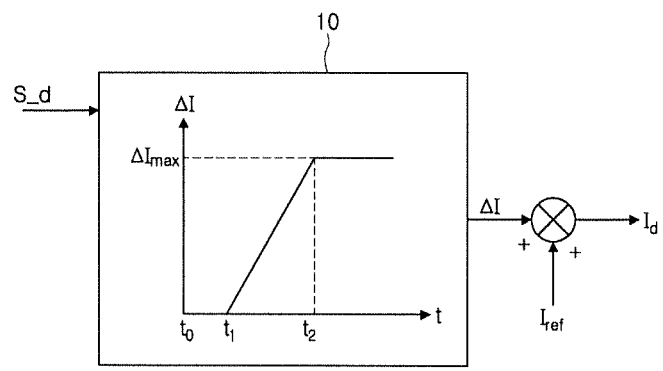
FIG. 1 is a block diagram illustrating a prior artHVDC power increase controller.

Hereinafter, embodiments of the present disclosure will be described as follows with reference to the attached drawings.

The features and aspects described herein may be embodied in many different forms and should not be construed as being limited to the specific embodiments set forth herein. Rather, these embodiments are provided so that this disclosure will be thorough and complete, and will convey a scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on, " "directly connected to," or "directly coupled to" another element, there may be no other elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship relative to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" relative to other elements would then be oriented "below," or "lower" relative to the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

Figure 2:
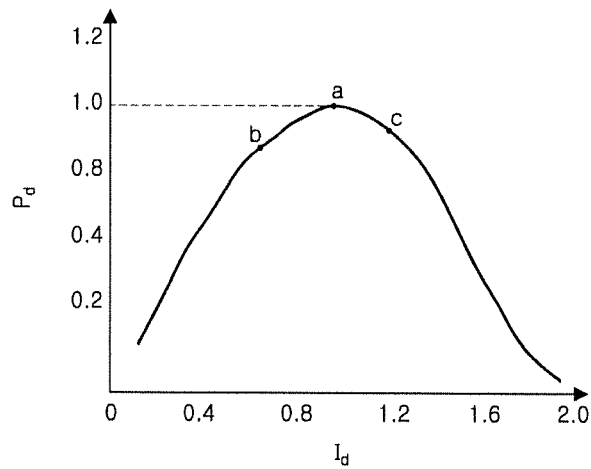
FIG. 2 is a graph illustrating a relationship between a current command value and a direct current (DC) power.

FIG. 1 is a block diagram illustrating a prior art high voltage direct current (HVDC) power increase controller, and FIG. 2 is a graph illustrating a relationship between a current command value and a direct current (DC) power.

Figure 3A:
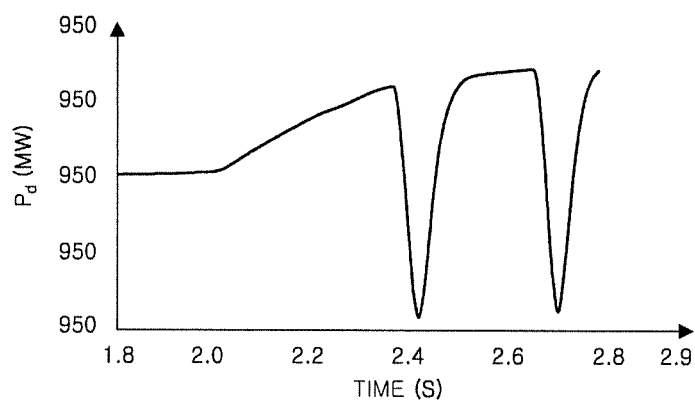
FIGS. 3A and 3B are graphs illustrating an example in which an HVDC system is operated in an unstable state.
Figure 3B:
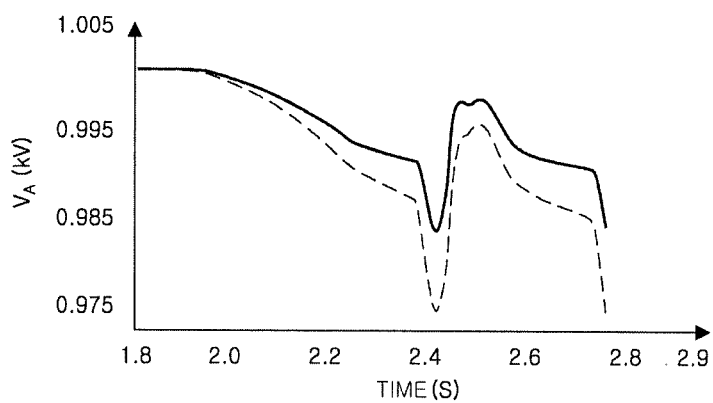

FIGS. 3A and 3B are graphs illustrating an example in which an HVDC system is operated in an unstable state.

With reference to FIG. 1, an prior art HVDC power increase controller 10 may add $\Delta I$ increased in the form of a ramp waveform from a disturbance detection time $t_1$ to an input time $t_2$ of a capacitor according to a disturbance signal S_d, to a reference current $I_{ref}$ so as to output a current command value $I_d$.

In an HVDC system, a transmission-available DC power maybe limited, and a maximum DC power point may vary according to operating conditions.

With reference to FIG. 2, a graph of a DC power $P_d$ as compared to a current command value $I_d$.

When an HVDC system is operated at an operating point (for example, b) having a current command value $I_d$ less than a maximum power point a, the HVDC system may be operated in a normal state. When the HVDC system is operated at an operating point (for example, c) having a current command value $I_d$ higher than a maximum power point a, the HVDC system may be operated in an unstable state. With reference to FIGS. 3A and 3B, when an HVDC system is operated in an unstable state, a rectification failure occurs due to a reduction in an AC voltage $V_A$, instantaneous attenuation of a DC power $P_d$ is confirmed to occur.

In the case in which a low current command value $I_d$ is maintained so as to maintain a stable state, obtaining sufficient stabilization system efficiency may be limited.

Figure 4:
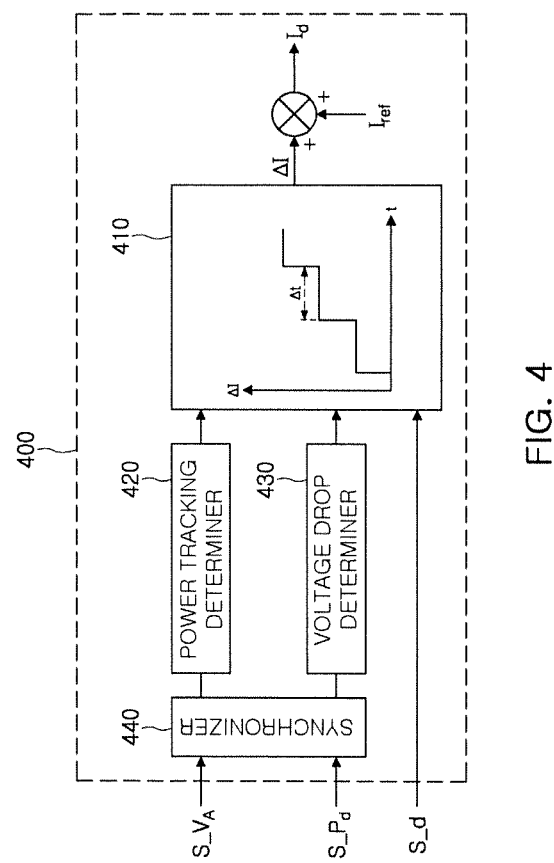
FIG. 4 is a block diagram illustrating an example of an HVDC power increase controller.

FIG. 4 is a block diagram illustrating an example of an HVDC power increase controller.

With reference to FIG. 4, an HVDC power increase controller 400 includes a command output unit 410, a voltage drop determiner 420, and a power tracking determiner 430, and may further include a synchronizer 440.

The command output unit 410 receives a disturbance signal S_d, and outputs a current command value $I_d$ according to the disturbance signal S_d to a main controller. Here, the current command value $I_d$ which may be a value at which a reference current $I_{ref}$ is added to $\Delta I$ is described with reference to FIG. 1.

In addition, the command output unit 410 receives a comparison result of the voltage drop determiner 420 and the power tracking determiner 430 to adjust the current command value according to the comparison result thereof.

As illustrated in FIG. 1, the current command value $I_d$ may have a step waveform. When the current command value $I_d$ has a step waveform, the current command value $I_d$ may be changed in stages to be efficiently adjusted, as compared to the case in which the current command value has a ramp waveform.

The voltage drop determiner 420 receives an AC voltage $V_A$, and compares a level of the AC voltage $V_A$ to a lowest level of a voltage causing a rectification failure. Here, the voltage drop determiner 420 may directly receive an AC voltage $V_A$, or may receive an AC voltage signal $S\_V_A$ including data with respect to the AC voltage $V_A$.

The power tracking determiner 430 receives a DC power $P_d$ to compare a level of the DC power $P_d$ to an estimated power level corresponding to a current command value. Here, the power tracking determiner 430 may directly receive the DC power $P_d$ or may receive a DC power signal $S\_P_d$ including data with respect to the DC power $P_d$.

The synchronizer 440 synchronizes the AC voltage $V_A$ and the DC power $P_d$ to output the AC voltage $V_A$ and the DC power $P_d$ to the voltage drop determiner 420 and the power tracking determiner 430, respectively.

The command output unit 410 increases $\Delta I$ when conditions in which a level of the AC voltage $V_A$ is higher than a lowest level of the voltage and a level of the DC power $P_d$ is the same as the estimated power level are satisfied, to increase the current command value $I_d$ as a result. When the conditions described above are not satisfied, the command output unit returns the current command value Id to a value at a previous time t-$\Delta$t before a current time t.

Thus, the command output unit 410 may confirm whether the DC power by the current command value $I_d$ normally tracks the estimated power, and a level of the AC voltage $V_A$ above a lowest level of the voltage causing a rectification failure may be maintained.

Thus, the HVDC power increase controller may output a current command value tracking a maximum power point, and may prevent a rectification failure.

Figure 5:
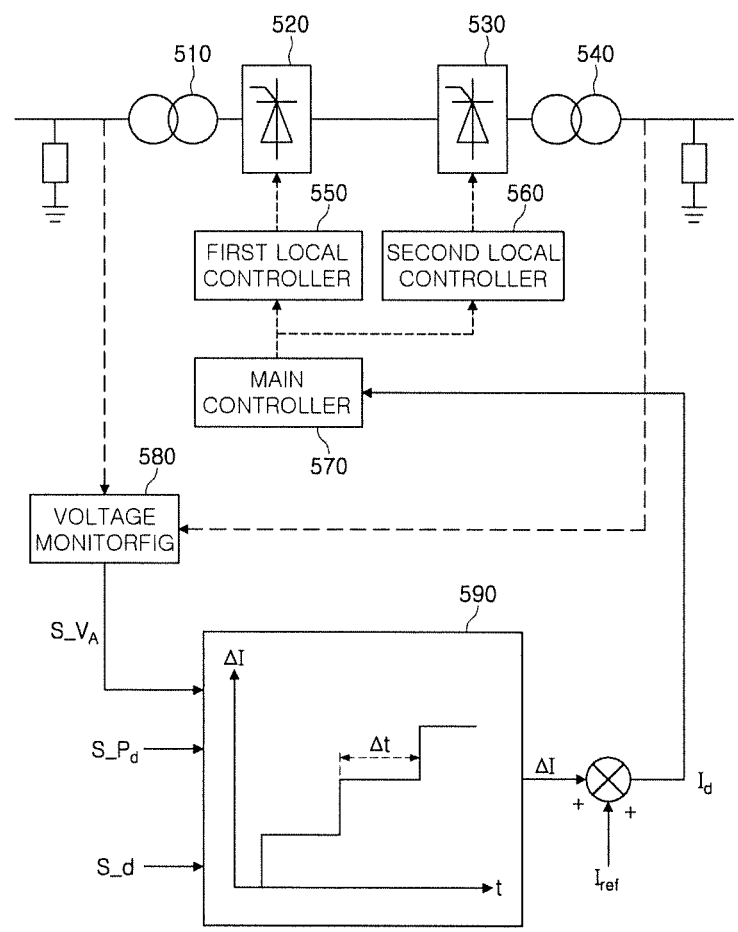
FIG. 5 is a block diagram illustrating an example of an HVDC system.

FIG. 5 is a block diagram illustrating an example of an HVDC system.

With reference to FIG. 5, an HVDC system includes a first transformer 510, a first converter 520, a second converter 530, a second transformer 540, a main controller 570, and an HVDC power increase controller 590.

The first transformer 510 transforms a first AC power, and the first converter 520 converts the transformed first AC power into a DC power according to control of a first local controller 550.

The second converter 530 converts the DC power into a second AC power according to control of a second local controller 560, and the second transformer 540 transforms the second AC power converted in the second converter 530.

The main controller 570 controls the first local controller and the second local controller, which may be performed by remote communications.

The HVDC power increase controller 590 may output the current command value $I_d$ to the main controller 570 according to input of a disturbance signal. Here, the current command value $I_d$ may have a step waveform. In detail, the HVDC power increase controller 590 compares a level of a voltage of the first AC power to a lowest level of the voltage causing a rectification failure, and compares a level of the DC power to an estimated power level corresponding to a current command value to adjust the current command value $I_d$ according to a comparison result thereof to be output.

To this end, an HVDC system may further include a voltage monitor 580 detecting a voltage of the first AC power and a voltage of the second AC power.

The DC power may be detected in a DC system including the first converter 520 or the second converter 530.

The HVDC power increase controller 590 may synchronize a voltage of the first AC power and the DC power. As described with reference to FIG. 4, when conditions in which a level of a voltage of the first AC power or the second AC power (in other words, an AC voltage) is higher than a lowest level of the voltage, and a level of the DC power $P_d$ is higher than or the same as the estimated power level are satisfied, the HVDC power increase controller 590 increases a current command value $I_d$. When the conditions described above are not satisfied, the HVDC power increase controller returns the current command value $I_d$ to a value at a previous time t-Δt before a current time t.

Figure 6A:
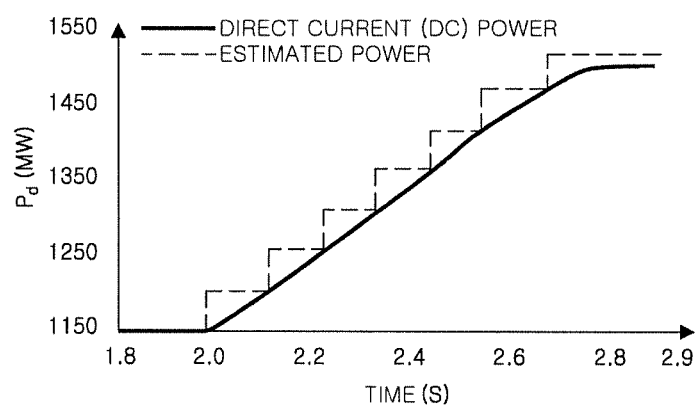
FIGS. 6A and 6B are graphs illustrating a DC power and an alternating current (AC) voltage of an example of an HVDC system, respectively.
Figure 6B:
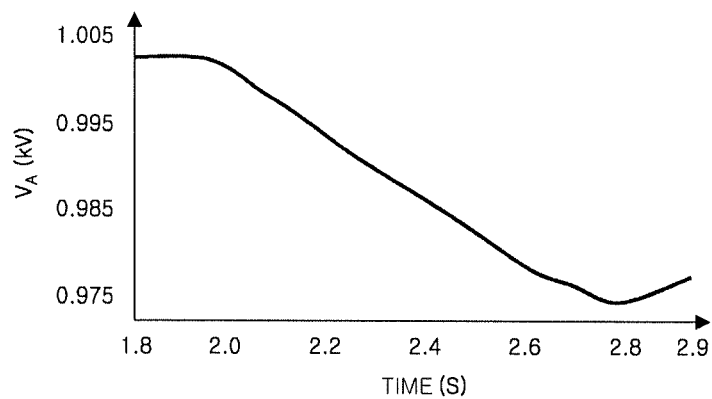

FIGS. 6A and 6B are graphs illustrating a DC power and an AC voltage of an example of an HVDC system, respectively.

With reference to FIG. 6A, a DC power $P_d$ tracking an estimated power according to a current command value $I_d$ increased in stages may be confirmed to be stably increased without instantaneous attenuation.

With reference to FIG. 6B, a rectification failure caused by a reduction in an AC voltage $V_A$ is confirmed not to occur.

As set forth above, according to an exemplary embodiment an HVDC power increase controller and an HVDC system including the same may efficiently stabilize a system by outputting a current command value tracking a maximum power point with respect to variation in a direct current (DC) power occurring in a failure caused by overloading or generator dropping or the like, and may prevent a rectification failure caused by an increase in a DC power.

While exemplary embodiments have been shown and described above, it will be apparent to those skilled in the art that modifications and variations could be made without departing from the scope of the present invention as defined by the appended claims.

What is claimed is:

1. A high voltage direct current (HVDC) power increase controller comprising:
a command output unit outputting a current command value to a main controller according to a disturbance signal;
a voltage drop determiner receiving an alternating current (AC) voltage, and comparing a level of the AC voltage to a voltage at a lowest level causing a rectification failure; and
a power tracking determiner receiving a direct current (DC) power, and comparing a level of the DC power to an estimated power level corresponding to the current command value,
wherein the command output unit adjusts the current command value according to a comparison result of the voltage drop determiner and power tracking determiner.

2. The HVDC power increase controller of claim 1, wherein the current command value has a step waveform.

3. The HVDC power increase controller of claim 1, wherein the command output unit increases the current command value when conditions in which a level of the AC voltage is higher than a lowest level of the voltage and a level of the DC power is higher than or the same as the estimated power level are satisfied, and returns the current command value to a previous value when the conditions are not satisfied.

4. An HVDC system comprising:
a first transformer for transforming a first alternating current (AC) power;
a first converter for converting the first AC power transformed in the first transformer to a direct current (DC) power according to control of a first local controller;
a second converter for converting the DC power to a second AC power according to control of a second local controller;
a second transformer for transforming the second AC power converted in the second converter;
a main controller for controlling the first local controller and the second local controller; and
an HVDC power increase controller for outputting a current command value having a step waveform according to input of a disturbance signal to the main controller,
wherein the HVDC power increase controller compares a level of a voltage of the first AC power to a lowest level of a voltage causing a rectification failure and compares a level of the DC power to an estimated power level corresponding to the current command value to adjust the current command value according to a comparison result.

5. The HVDC system of claim 4, wherein the HVDC power increase controller increases the current command value when conditions in which a level of the voltage of the first AC power or the second AC power is higher than a lowest level of the voltage and a level of the DC power is the same as or higher than the estimated power level are satisfied, and returns the current command value to a previous value when the conditions are not satisfied.

* * * * *